United States Patent
Yu et al.

(10) Patent No.: US 8,976,186 B2
(45) Date of Patent: *Mar. 10, 2015

(54) IMAGE PROCESSING APPARATUS AND METHOD THEREOF

(75) Inventors: Chung-Ping Yu, Taipei County (TW); Cheng-Han Li, Taichung (TW)

(73) Assignee: Realtek Semiconductor Corp., Hsinchu (TW)

( * ) Notice: Subject to any disclaimer, the term of this patent is extended or adjusted under 35 U.S.C. 154(b) by 553 days.

This patent is subject to a terminal disclaimer.

(21) Appl. No.: 13/039,654

(22) Filed: Mar. 3, 2011

(65) Prior Publication Data

US 2011/0216081 A1    Sep. 8, 2011

(30) Foreign Application Priority Data

Mar. 3, 2010    (TW) ................................ 99106072 A

(51) Int. Cl.
*G09G 5/39*    (2006.01)
*G09G 5/36*    (2006.01)

(52) U.S. Cl.
CPC ....................................... *G09G 5/36* (2013.01)
USPC ........... 345/547; 348/448; 348/452; 348/607; 382/236

(58) Field of Classification Search
CPC .................................... G06T 5/50; G09G 5/36
USPC ....................................................... 345/547
See application file for complete search history.

(56) References Cited

U.S. PATENT DOCUMENTS

| 5,428,397 | A | 6/1995 | Lee et al. | |
|---|---|---|---|---|
| 7,460,734 | B2* | 12/2008 | Chao | 382/300 |
| 2004/0085449 | A1* | 5/2004 | Millet et al. | 348/152 |
| 2007/0290964 | A1* | 12/2007 | Yang | 345/87 |
| 2009/0028391 | A1* | 1/2009 | Chen | 382/107 |
| 2009/0135255 | A1* | 5/2009 | Tzeng | 348/180 |
| 2009/0244389 | A1 | 10/2009 | Mishima et al. | |
| 2010/0061648 | A1* | 3/2010 | Wong et al. | 382/260 |
| 2013/0300883 | A1* | 11/2013 | Mistretta et al. | 348/208.4 |

* cited by examiner

*Primary Examiner* — Ke Xiao
*Assistant Examiner* — Weiming He
(74) *Attorney, Agent, or Firm* — Muncy, Geissler, Olds & Lowe, P.C.

(57) ABSTRACT

This invention provides an image processing apparatus and an image processing method. By calculation of the pixel difference that is the difference of each corresponding pixels between the current image and the previous image with its neighbor pixel difference, this invention can determine the blending value. Furthermore, the image processing apparatus comprises a pixel buffer unit for storing the current image and the previous image; a pixel difference calculating unit for calculating a plurality of pixel differences; a moving judgment unit, coupled to the pixel difference calculating unit, for determining the pixel moving or static according to by the plurality of pixel differences; a blending value determining unit, coupled to the moving judgment unit, for determining a new blending value when the pixel is static; and an output unit, coupled to the blending value determining unit, for generating an output image by adding the pixels belonging to the same positions pixels on the current image and the previous image with a weighting according to the blending value.

5 Claims, 11 Drawing Sheets

IMAGE PROCESSING APPARATUS AND METHOD THEREOF

BACKGROUND OF THE INVENTION (a) Field of the Invention

The present invention relates to an image processing apparatus and method, more particularly, to an image processing apparatus and method for determining a blending value according to a motion level of an image.

(b) Description of the Related Art

Video content typically includes a plurality of frames or fields, and the frames (or fields) are transmitted as a consecutive sequence. During transmission, if there is a moving object in the video content, pixel differences are present between current and previous frames, that is, differences between pixel values of pixels of the same location occur with respect to present and previous frames. This is because a pixel may be part of an object in the previous frame, and the same pixel may change to be part of the background in the current frame. Therefore, the error is the pixel difference between the object and the background.

At present, mean absolute difference (MAD) is the most widely used technique for determining whether video content exhibits moving object characteristics. This is accomplished by comparing a MAD value with a predetermined threshold value. The larger MAD value, the greater number of pixel differences caused by object movement, and the smaller MAD value, the smaller number of pixel differences caused by object movement. Therefore, conventional approaches use the size of the numerical value of MAD to determine whether there is object movement.

However, in some special cases, for example: the objects the image moving rapidly back and forth, the moving object may be considered as stationary through the calculation of MAD, therefore, the mistaking movement will occurs. Blending the image in such mistaking movement, the end result will be image streaking.

BRIEF SUMMARY OF THE INVENTION

Therefore, in order to solve these problems, one of the purposes of this invention is to provide an image processing apparatus can determine whether image exists noise, and solve mistaken problem of the prior art.

One of the purposes of this invention is to provide an image processing apparatus. The image processing apparatus comprises a pixel buffer unit, a pixel difference calculating unit, a motion level determining unit, a blending value determining unit, and an output unit. The pixel buffer unit is used to store a plurality of first pixels of a previous image and a plurality of second pixels of a current image in a sampling window. The pixel difference calculating unit for calculating a pixel difference between the first pixel and the second pixel at a position corresponding to the first pixel, and outputting a plurality of pixel differences. The motion level determining unit, for deciding a blending value of a pixel of in the sampling window and determining whether the pixel is a static pixel or a moving pixel according to the pixel difference. The blending value determining unit coupled to the motion level determining unit, for determining a new blending value when the pixel is a static pixel. The output unit coupled to the blending value determining unit, for calculating the current image and the previous image using weighted average according to the blending value so as to generate and output an output image when the pixel is static pixel; and adding together weights of the current image and the previous image according to the new blending value to generate and output the output image when the pixel is a static pixel.

According to another aspect, the image processing method of this invention includes the following steps: storing a plurality of first pixels of a previous image and a plurality of second pixels of a current image in a sampling window; calculating a difference value between the first pixel and the second pixel at a position corresponding the first pixel, and outputting a plurality of pixel differences; deciding a blending value of a pixel of in the sampling window, and determining the pixel static or moving pixel according to the pixel difference; determining a new blending value when the pixel is a static pixel; and calculating the current image and the previous image using weighted average according to the blending value so as to generate and output an output image when the pixel is a moving pixel, and calculating the current image and the previous image using weighted average according to the new blending value so as to generate and output the output image when the pixel is a static pixel.

DETAILED DESCRIPTION OF THE INVENTION

Figure 1:
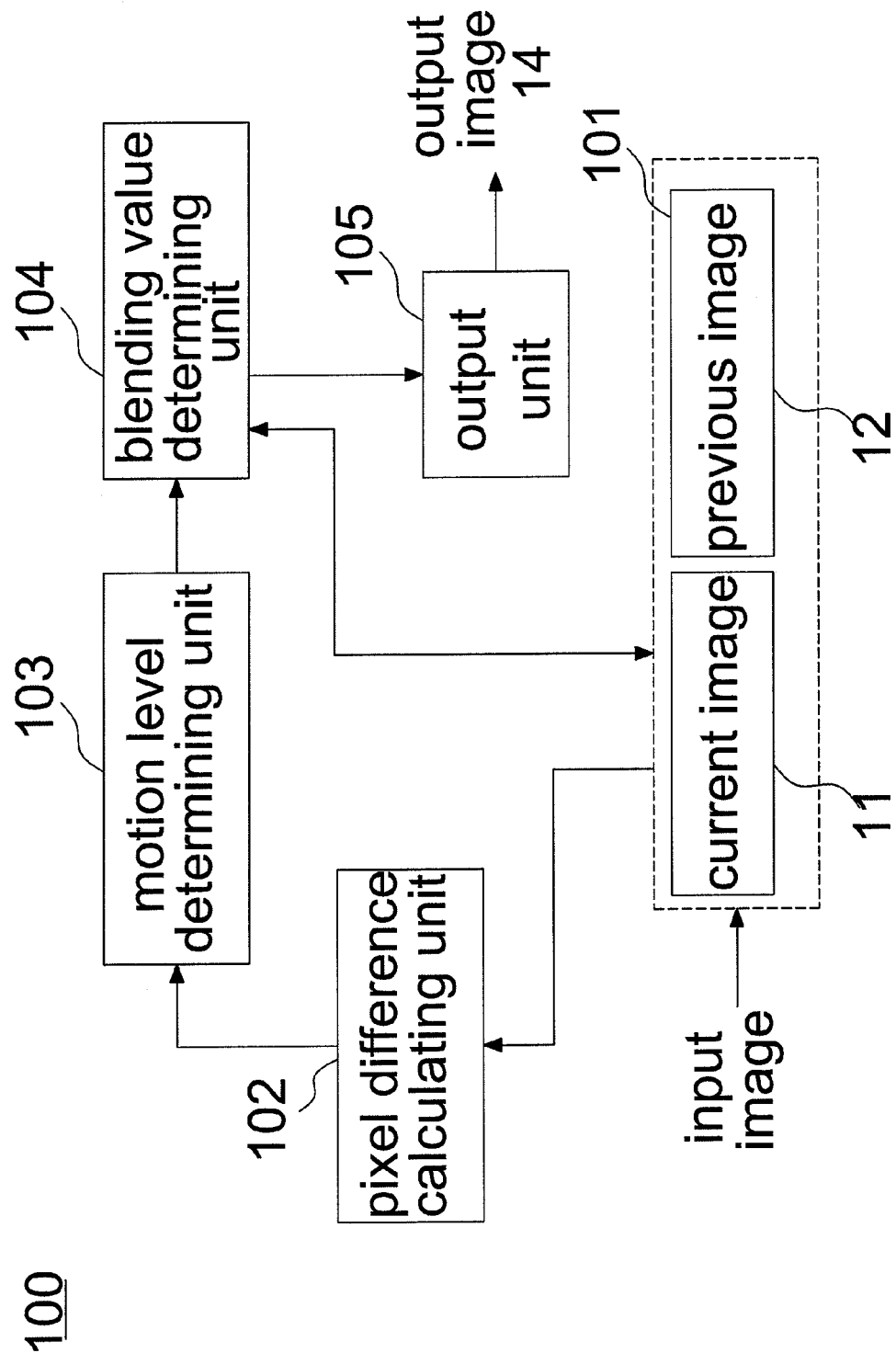
FIG. 1 shows a diagram illustrating an image processing apparatus according to one embodiment of the invention.

Please refer to FIG. 1, FIG. 1 shows a diagram illustrating an image processing apparatus according to one embodiment of the invention. The image processing apparatus comprises a pixel buffer unit 101, a pixel difference calculating unit 102, a motion level determining unit 103, a blending value determining unit 104, and an output unit 105.

The pixel buffer unit 101 receives an input image, stores a current image 11 and a previous image 12 of a sampling window. Wherein, current image 11 and the previous image 12 respectively have a plurality of pixels, and each pixel has a pixel value which includes a luma and a chroma.

The pixel difference calculating unit 102 receives current image 11 and previous image 12, and calculates the pixel difference of each pixel according to the pixel value of the same position of the current image 11 and the previous image 12, to gather all the pixel difference to form a pixel difference matrix.

Figure 2:
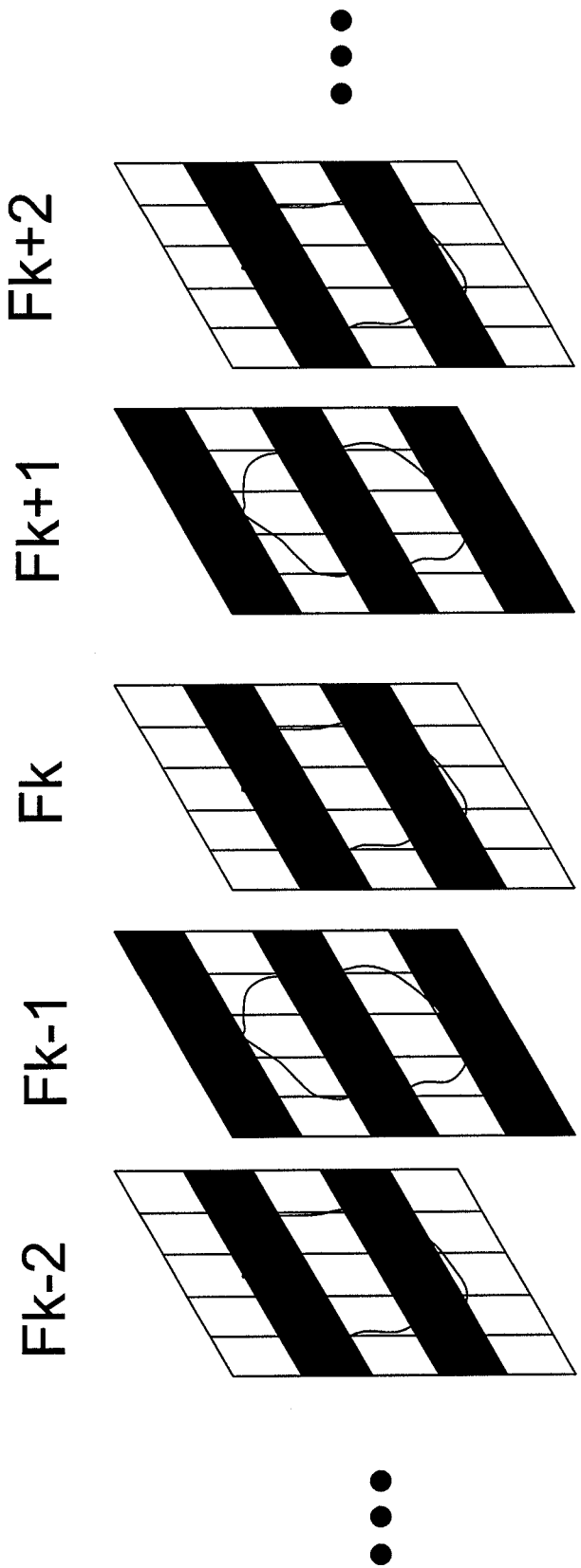
FIG. 2 shows a diagram of a field sequence.

Please also refer to FIG. 2, FIG. 2 shows a diagram of a field sequence. In one embodiment of the invention, a consecutive field sequence F is formed by interposing an even field, such as field $F_{k-2}$, field $F_k$, and $F_{k+2}$, between a pair of odd fields, such as fields $F_{k-1}$ and $F_{k+1}$.

Figure 3:
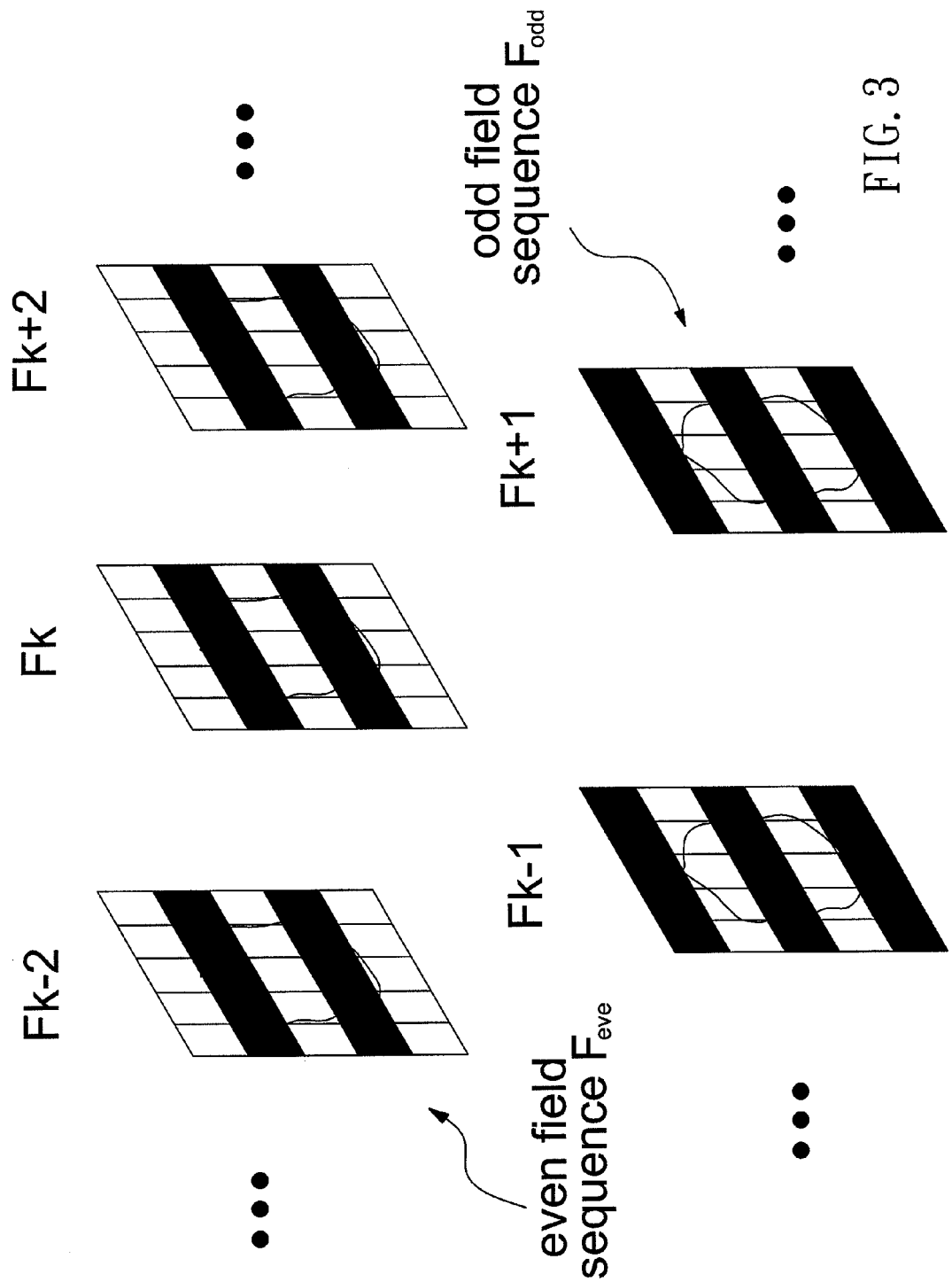
FIG. 3 shows a diagram illustrating a of an even field sequence and an odd field sequence.

The current image is a kth field (or a (k+1)th field), and the previous image is a (k−2)th field (or a (k−1)th field). Therefore, also referring to FIG. 3, after the even field sequence $F_{eve}$ and the odd field sequence $F_{odd}$ can be separated into two independent field sequences, the image processing apparatus of this invention can be used.

Figure 4:
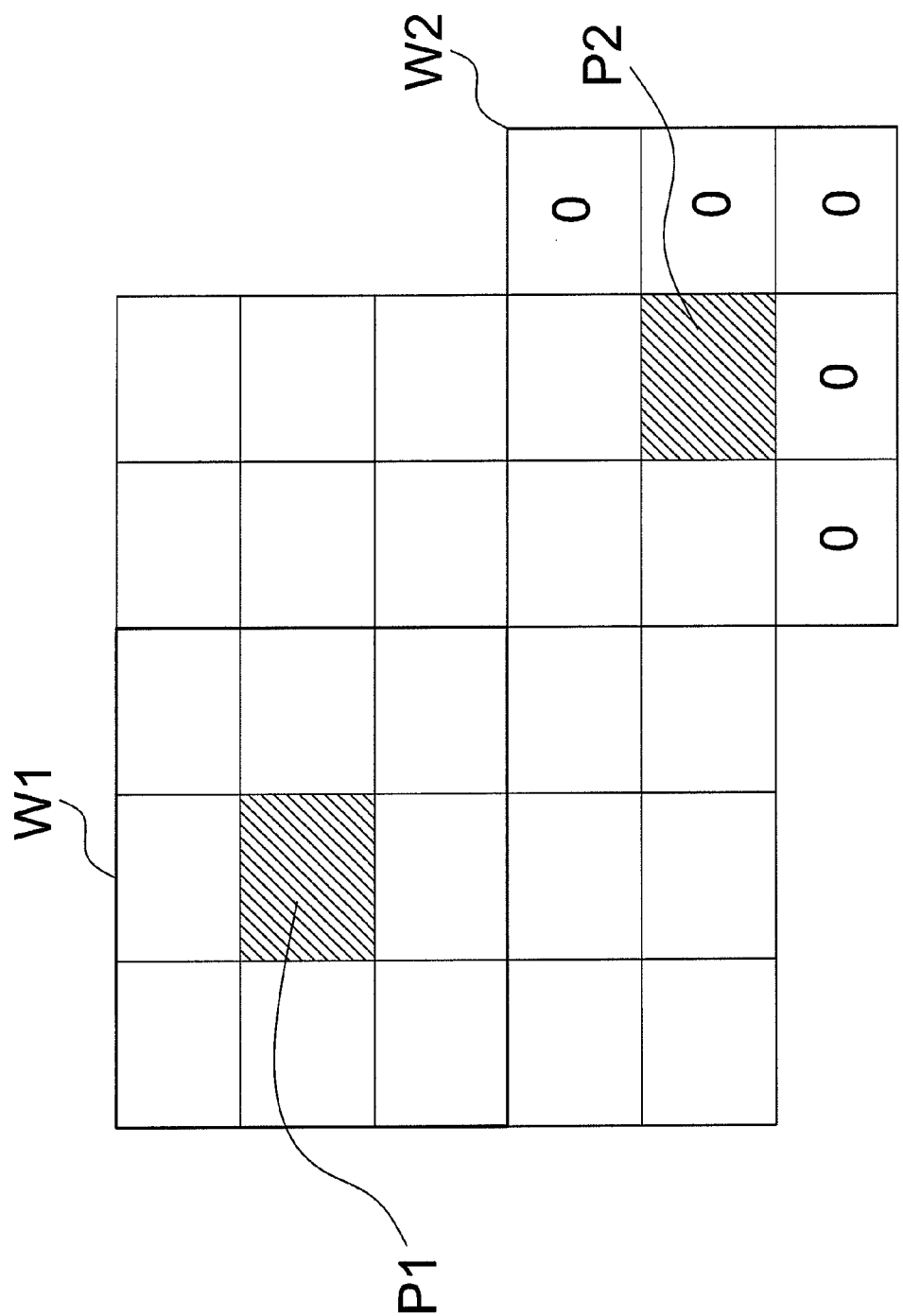
FIG. 4 shows a diagram of a current sampling window of a pixel.

In this embodiment, the field $F_k$ is the current image of the even field sequence $F_{eve}$, and the field $F_{k-2}$ is the previous image. Similarly, the field $F_{k+1}$ is the current image of the odd field sequence $F_{odd}$, and the field $F_{k-1}$ is the previous image. The even field sequence $F_{eve}$ and the odd field sequence $F_{odd}$ can be processed simultaneously by two image processing apparatuses in parallel, or using time-divisional manner to the even field sequence $F_{eve}$ and the odd field sequence $F_{odd}$ by one image processing apparatus The pixel difference calculating unit 102 uses each pixel as a center point to establish a corresponding sampling window. For example (the even field sequence $F_{eve}$ as an example), please also refer to FIG. 4, FIG. 4 shows a diagram of a current sampling window of a pixel. Wherein, the size of the sampling window, in this embodiment, is a predetermined value m×n. In FIG. 4, the corresponding sampling window is W1 for pixel P1. For the pixel at a boundary of an image (e.g., P2), the portions outside the image of FIG. 4 can be represented by "0" to form a completed sampling window. This method will not affect the processing result due to the portions outside the previous image and the portions outside the image of FIG. 4 are the same.

It is to be noted that, current image 11 and previous image 12 can be a frame, the current image 11 can be a kth frame, and the current image 11 can be a (k−1)th frame. Other operational principles are the same as aforementioned, detail description is omitted here for sake of brevity.

Figure 5:
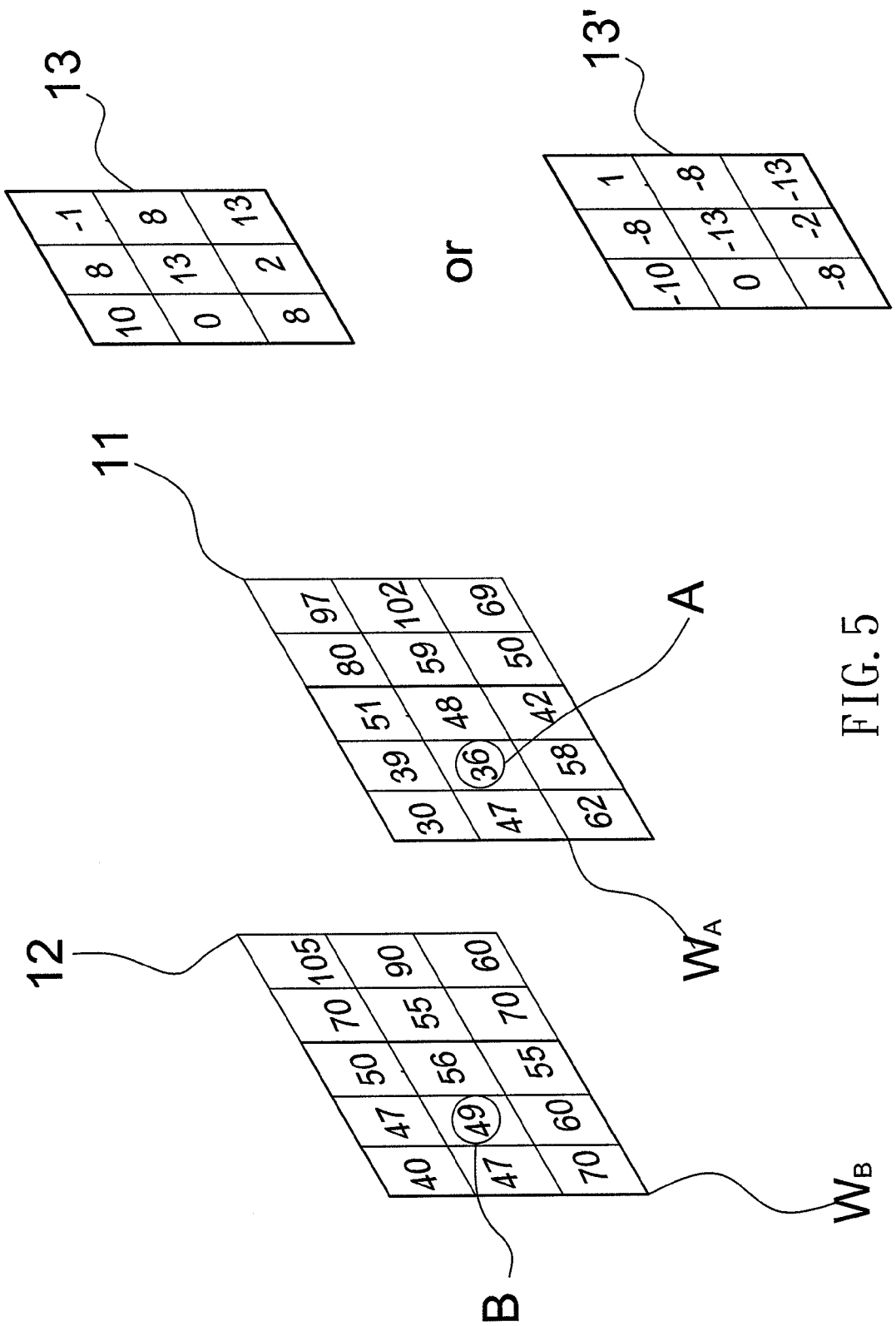
FIG. 5 shows a diagram illustrating pixel difference matrices according to one embodiment.

Please also refer to FIG. 5, FIG. 5 shows a diagram illustrating pixel difference matrices according to one embodiment (even field sequence $F_{eve}$ as an example), the actual existence of the pixels combine into the pixel matrix of the current image 11 and the previous image 12. In other words, the pixel difference calculating unit 102 uses a pixel A of the current image 11 as a center point to establish a corresponding current sampling window $W_A$. Wherein, the sampling window size can be a predetermined value of m×n, or the size can be defined by user. In the present embodiment, it is assumed that the sampling window size is 3×3.

Meanwhile, using a pixel B of the previous image 12 as a center point to establish a corresponding previous sampling window $W_B$. Next, calculate corresponding pixel differences on current sampling window of each pixel and the previous sampling window of each pixel having corresponding location, and then collect all the pixel differences to form a pixel difference matrix. Wherein, the location of the pixel A in current image 11 corresponds to the location of the pixel B in previous image 12.

When pixel difference calculating unit 102 is configured to subtract pixel values of previous image 12 from corresponding pixel values of current image 11, the calculation result will be the pixel difference matrix 13 shown in the FIG. 5. Alternatively, when the pixel difference calculating unit 102 is configured to subtract pixels values of a current image 11 from corresponding pixel values of a previous image 12, the calculation result will be the pixel difference matrix 13' shown in the FIG. 5.

Pixel difference matrix 13 and 13' have a plurality of pixel differences respectively. The pixel difference calculation unit 102 calculates the absolute value of the sum of all the pixel differences in pixel matrix 13 or 13' and uses the absolute value to be the total pixel difference D of the sampling window. Then, the motion level determining unit 103 determines a blending value of the center pixel of the sampling window, and determines whether this center pixel is moving or not.

In the present embodiment, assuming the sampling window size is 3×3, the pixel difference matrix 13 is configured to subtract the current image 11 from the previous image 12, therefore, the pixel difference matrix 13' is the result as shown in FIG. 5.

The formula for calculating the total pixel difference of the sampling windows $W_A$ and $W_B$ by pixel difference calculation unit 102 as shown in following:

Total pixel difference $D=|10+8-1+0+13+8+8+2+13|=61$, or

Total pixel difference $D=|-10-8+1+0-13-8-8-2-13|=61$

Four predetermined threshold values are configured in the motion level determining unit 103 according to the result calculated by the pixel difference calculating unit 102. Four predetermined threshold values are a first threshold value TH1, a second threshold value TH2, a third threshold value TH3, and a forth threshold value TH4. The relations of the four predetermined threshold values as following: the first threshold value TH1 is smaller than the second threshold value TH2; the second threshold value TH2 is smaller than the third threshold value TH3; the third threshold value TH3 is smaller than the forth threshold value TH4.

When the total pixel difference D of the sampling windows $W_A$, $W_B$ is smaller than the first threshold value TH1, the blending value K of the pixel difference is configured as 0; when the total pixel difference D of the sampling windows $W_A$, $W_B$ is greater than the first threshold value TH1 and smaller than the second threshold value TH2, the blending value K of the pixel difference is configured as 0.25; when the total pixel difference D of the sampling windows $W_A$, $W_B$ is greater than the second threshold value TH2 and smaller than the third threshold value TH3, the blending value K of the pixel difference is configured as 0.5; when the total pixel difference D of the sampling windows $W_A$, $W_B$ is greater than the third threshold value TH3 and smaller than the forth threshold value TH4, the blending value K of the pixel difference is configured as 0.75; when the total pixel difference D of the sampling windows $W_A$, $W_B$ is greater than the forth threshold value TH4, the blending value K of the pixel difference is configured as 1.

In this embodiment, it is assumed that the first threshold value TH1, the second threshold value TH2, the third threshold value TH3, and the forth threshold value TH4 are 20, 50, 100, and 150 respectively. By calculating the total pixel difference D of the sampling windows $W_A$ and $W_B$, the total pixel difference D is 61 in this embodiment, the total pixel difference D is greater than the second threshold value TH2 and smaller than the third threshold value TH3, and the motion level determining unit 103 obtains the blending value K of the center pixel of the sampling window 0.5.

It is noted that, the first threshold value TH1, the second threshold value TH2, the third threshold value TH3, and the forth threshold value TH4 of the present invention can be configured according to user's requirement, present invention should not be limited.

In this embodiment, the center pixel of the sampling window $W_A$ is considered as a moving pixel when the total pixel difference D of sampling windows $W_A$, $W_B$ is greater than 50; the center pixel of the sampling window $W_A$ is considered as a static pixel when the total pixel difference D of the sampling windows $W_A$, $W_B$ is smaller than 50. In other words, the center pixel of sampling window $W_A$ is considered as a moving pixel when the total pixel difference D of sampling windows $W_A$, $W_B$ is greater than the second threshold value TH2;

the center pixel of sampling window $W_A$ is considered as a static pixel when the total pixel difference D of sampling windows $W_A$, $W_B$ is smaller than the second threshold value TH2.

In present embodiment, because the total pixel difference D of the sampling windows $W_A$, $W_B$ is greater than 50, the blending value determining unit 104 doesn't change the blending value K of center pixel of sampling windows $W_A$, the blending value K of center pixel of sampling window $W_A$ is still 0.5.

The output unit 105 calculates the center pixel of sampling window $W_A$ of current image and the center pixel of sampling window $W_B$ of previous image, using weighted average according to the blending value K determined by blending value determining unit 104, so as to output an output pixel of the output image. In other words, the output unit 105 calculates corresponding output pixel according to the blending value K of each pixel. When the output pixels of all the pixels being calculated, the output pixels are collected to form an output image 14. Then feedback the output image to pixel buffer unit 101 so as to be a previous image 12 in next calculation. The formula for calculating the output pixel as shown in following:

output pixel=corresponding pixel value of current image 11×K+corresponding pixel value of previous image 12×(1−K)

The formula for calculating the output pixel of output image 14 as shown in following:

output pixel=36×0.5+49×(1−0.5)=42.5

It is noted that, the output unit 105 uses the blending value K to calculates the weighted average of center pixel of sampling window $W_A$ of current image 11 and center pixel of sampling window $W_B$ of previous image 12 to output the output image 14 when the center pixel is a moving pixel; and the output unit 105 uses a new blending value K' to calculates the weighted average of center pixel of sampling window $W_A$ of current image 11 and center pixel of sampling window $W_B$ of previous image 12 to output the output image 14 when the center pixel is a static pixel.

Figure 6:
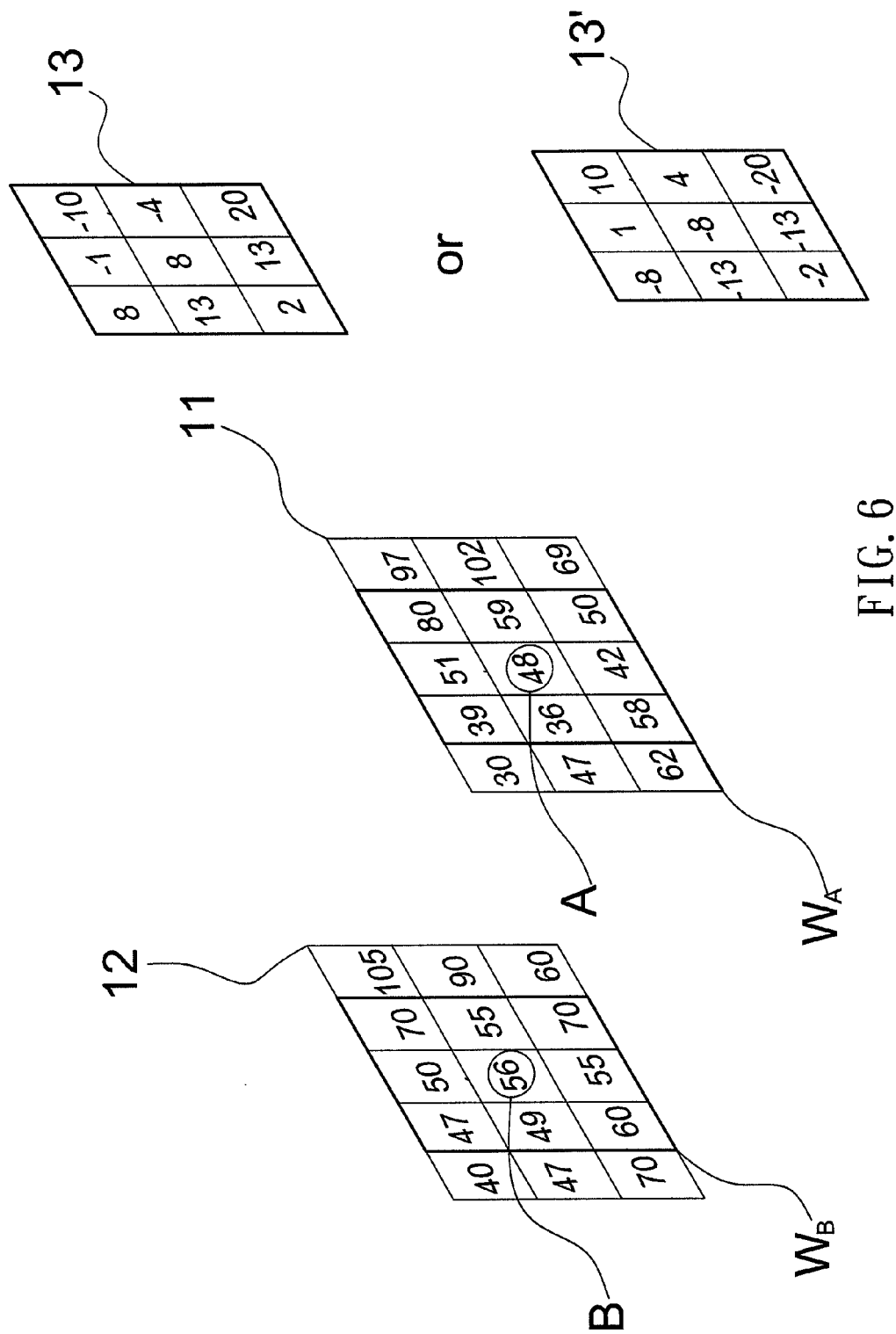
FIG. 6 shows a diagram illustrating pixel difference matrices according to one embodiment.

Please refer to FIG. 1 and FIG. 6, FIG. 6 shows a diagram illustrating a calculation sample of pixel difference matrices according to one embodiment. After the sampling window processed by the pixel difference calculation unit 102, the formula for calculating the pixel difference of the sampling window as shown in following:

Total pixel difference D=|8−1−10+13+8−4+2+13+20|=49, or

Total pixel difference D=|−8+1+10−13−8+4−2−13−20|=49

It is understood that the total pixel difference D is greater than the first threshold value TH1 and smaller than the second threshold value TH2, and therefore the motion level determining unit 103 obtains the blending value $K_A$ of center pixel of sampling window $W_A$ of current image 0.25.

When the total pixel difference D is smaller than the second threshold value TH2, the center pixel of the sampling window $W_A$ is considered as a static pixel. In the present example, the total pixel difference D is smaller than 50 (the second threshold value TH2), so the blending value determining unit 104 needs to change the blending value $K_A$ of center pixel of sampling window $W_A$ of current image 11 and configures a new blending value $K_A'$.

To be noted that, the center pixel of sampling window $W_A$ of current image 11 and the center pixel of sampling window $W_B$ of current image 12 have corresponding positions, and respectively have blending value $K_A$ and $K_B$.

Wherein, the blending value $K_B$ of center pixel of sampling window $W_B$, which blending value is finally determined by the blending value determining unit 104.

In this embodiment, the new blending value $K_A'$ is blending value $K_A$ when blending values $K_A$ and $K_B$ are equal; and the new blending value $K_A'$ is blending value $K_B$ when blending values $K_A$ and $K_B$ are not equal.

In other words, when the blending value $K_A$ of center pixel of sampling window $W_A$ of current image 11 is equal to the blending value $K_B$ of the center pixel of the sampling window $W_B$ of the previous image 12, the new blending value $K_A'$ of center pixel of sampling window $W_A$ of current image 11 is the blending value $K_A$; when the blending value $K_A$ of center pixel of sampling window $W_A$ of current image 11 is not equal to the blending value $K_B$ of center pixel of sampling window $W_B$ of previous image 12, the new blending value $K_A'$ of center pixel of sampling window $W_A$ of current image 11 is the blending value $K_B$.

Output unit 105 outputs the output pixel which calculation manner as aforementioned, detailed description is omitted herein for sake of brevity.

In one embodiment, when blending values $K_A$ and $K_B$ are equal, the new blending value $K_A'$ is the blending value $K_A$; and when the blending values $K_A$ and $K_B$ are different, the new blending value $K_A'$ is a calculation of the blending values $K_A$ and $K_B$. In another embodiment, the new blending value $K_A'$ is an average of the blending values $K_A$ and $K_B$. In the other embodiment, the new blending value $K_A'$ is rounding off the average of the blending values $K_A$ and $K_B$.

Furthermore, in one embodiment, the new blending value $K_A'$ is always an average of the blending values $K_A$ and $K_B$. In another one embodiment, the new blending value $K_A'$ is always rounding off the average of the blending values $K_A$ and $K_B$.

Figure 7:
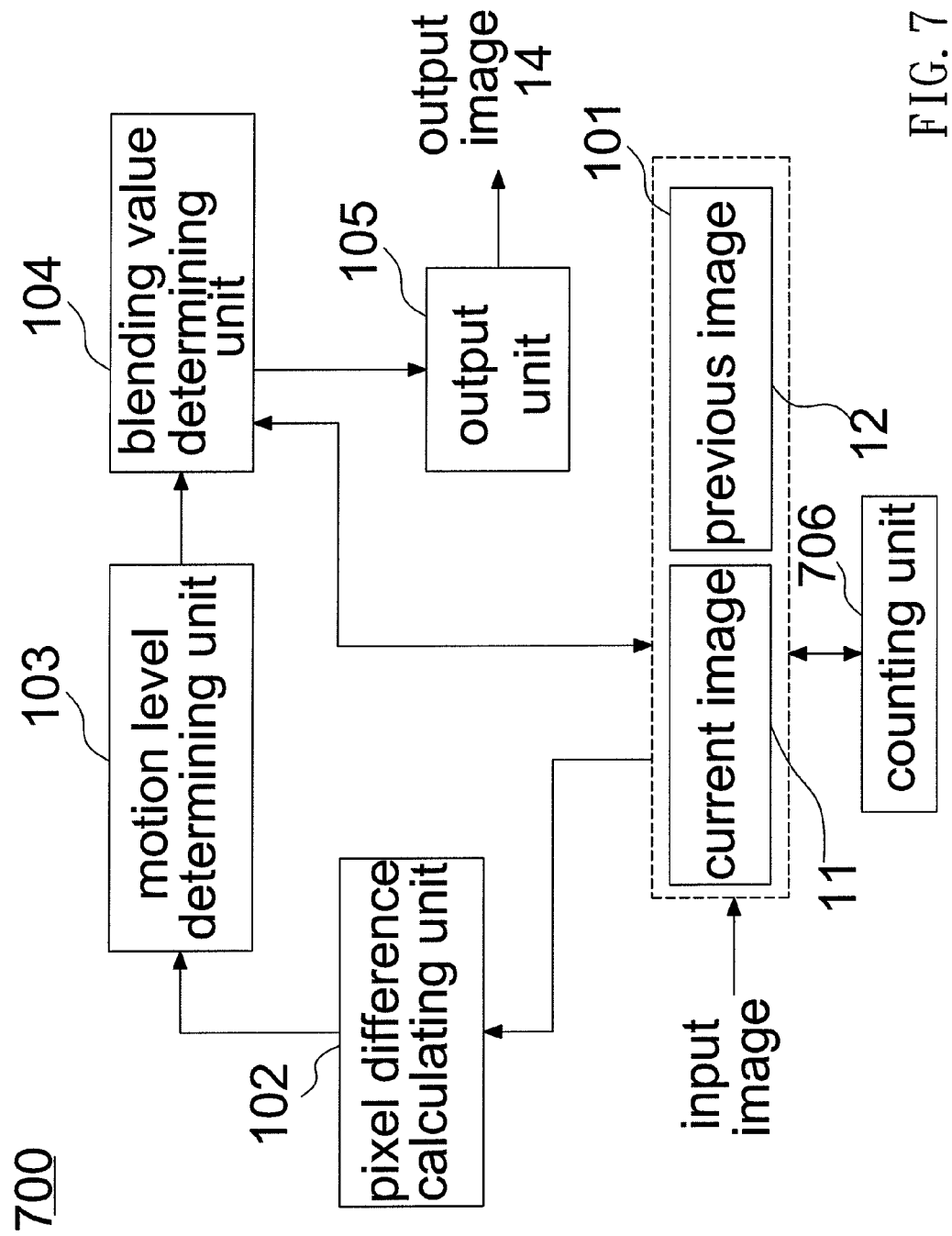
FIG. 7 shows a diagram illustrating an image processing apparatus according to one embodiment of the invention.

Please refer to FIG. 7, FIG. 7 shows a diagram illustrating an image processing apparatus according to one embodiment of the invention. The difference between FIG. 1 and FIG. 7 is that the image processing apparatus 700 further comprises a counting unit 706 to count the pixel number of the static pixel from the sampling window of the previous and current images.

Figure 8:
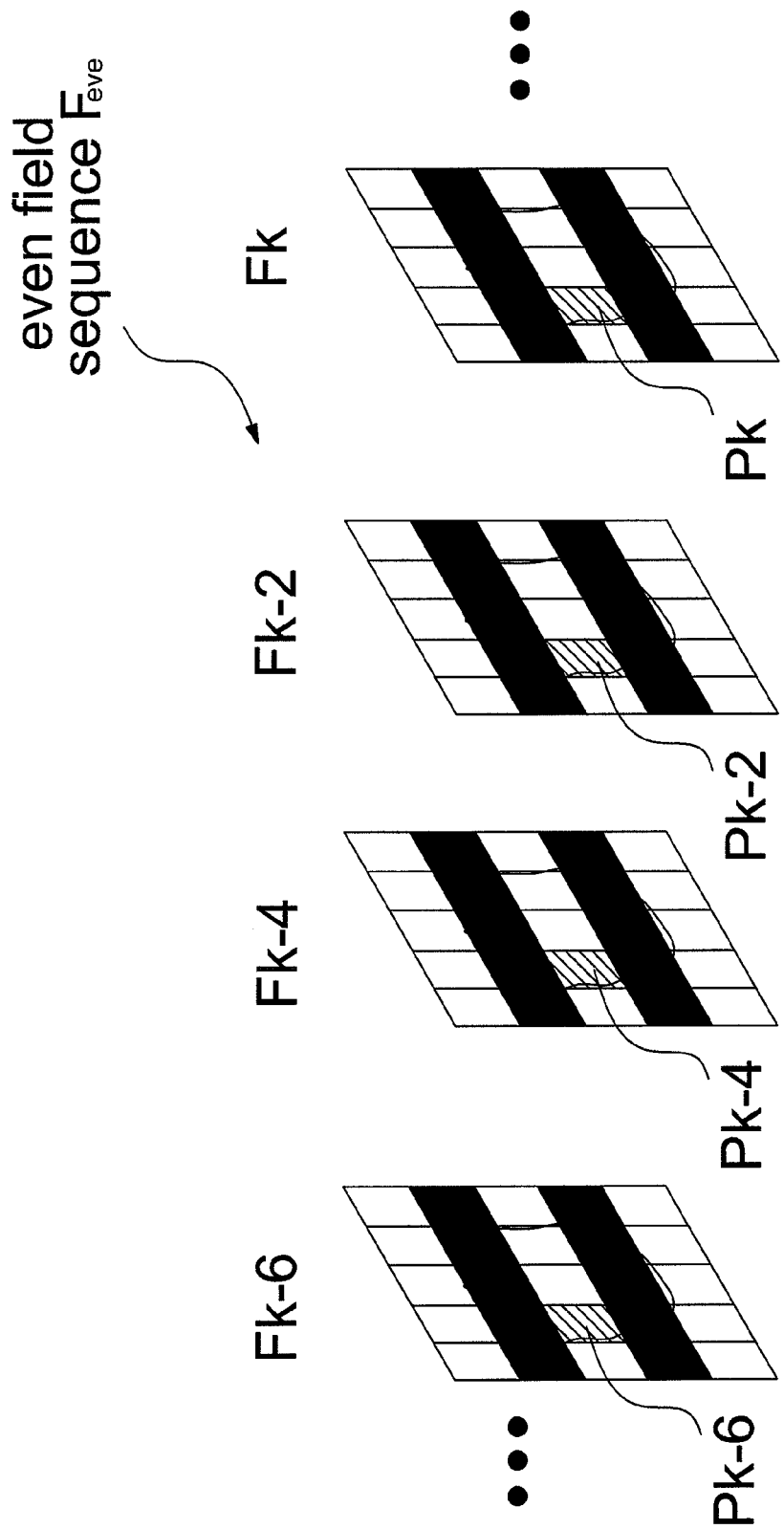
FIG. 8 shows a diagram of a field sequence of center pixel.

Please refer to FIG. 8, in this embodiment (taking even field sequence $F_{eve}$ as an example), the field $F_k$ of the even field sequence $F_{eve}$ is the current image, and the fields $F_{k-2}$, $F_{k-4}$, and $F_{k-6}$ are the previous images.

Assuming a sampling window size of 3×3, the same as above-mentioned, when the center pixel of the sampling window is determined as a moving pixel by motion level determining unit 103, the blending value determining unit 104 does not change the blending value K of the center pixel of the sampling window of the current image.

Otherwise, when the center pixel of the sampling window is determined as a static pixel, the counting unit 706 calculates plurality of blending values of center pixels of previous images, and records these blending values to determine whether corresponding pixel is moving or static.

For example, fields $F_{k-2}$, $F_{k-4}$, $F_{k-6}$ respectively have center pixels $P_{k-2}$, $P_{k-4}$, $P_{k-6}$ corresponding to center pixel of sampling window of field $F_k$, and these center pixels $P_{k-2}$, $P_{k-4}$, $P_{k-6}$ have corresponding previous blending values $K_{k-2}$, $K_{k-4}$, $K_{k-}$ respectively.

It is assumed that there are two static pixels, and one moving pixel among center pixels $P_{k-2}$, $P_{k-4}$, $P_{k-6}$. In this embodiment, when the number of static pixels is greater than a predetermined value (the predetermined value is 1 in the present embodiment), the new blending value K' of the center pixel $P_k$ of sampling window of fields $F_k$ is the blending value K. On the other hand, if the number of static pixels is 1, and the number of moving pixels is 2 among the center pixels $P_{k-2}$, $P_{k-4}$, $P_{k-6}$. In this embodiment, when the number of the static pixels is equal to or smaller than a predetermined value (the predetermined value is still 1), the new blending K' of center pixel $P_k$ of sampling window of the fields $F_k$ is previous blending value $K_{k-2}$.

In one embodiment, when the number of the static pixel of the center pixels $P_{k-2}$, $P_{k-4}$, $P_{k-6}$ is equal to or smaller than 1, the new blending K' of center pixel $P_k$ of sampling window of fields $F_k$ is a calculation of the previous blending values $K_{k-2}$ and $K_{k-4}$. The calculation is an average of the previous blending values $K_{k-2}$ and $K_{k-4}$. In another embodiment, the new blending value K' is rounding off the average of the blending values $K_{k-2}$ and $K_{k-4}$.

Figure 9:
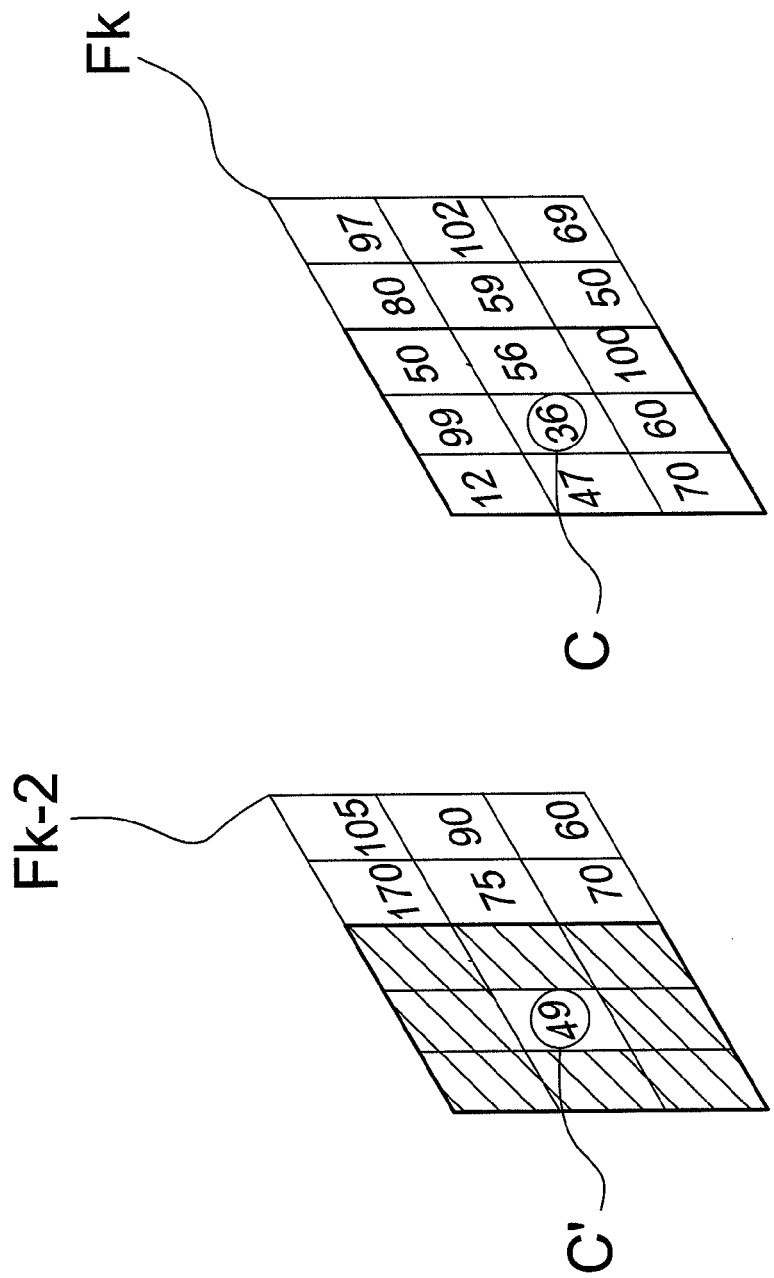
FIG. 9 shows a diagram of center pixel and neighbor pixel.

Please refer to FIG. 9, in one embodiment, field $F_k$ is current image and field $F_{k-2}$ is previous image. Assuming a sampling window size is still 3×3. The center pixel of sampling window in current image is C and which corresponding location for a center pixel of previous image is C'. Around the center pixel C' has a plurality of adjacent previous pixels, which represented by oblique lines in FIG. 9 (there are eight adjacent previous pixels in this embodiment.) and corresponding to a plurality of adjacent previous blending values (there are eight adjacent blending values in this embodiment.). When the number of static pixel is equal to or smaller than 1, the new blending value K' of center pixel of sampling window of field $F_k$ is a calculation of the eight adjacent blending values and the previous blending values $K_{k-2}$. In one embodiment, the calculation is an average of the eight adjacent blending values and the previous blending values $K_{k-2}$. In another embodiment, new blending value K' is rounding off the average of blending values $K_{k-2}$ and the eight adjacent blending values.

Output unit 105 outputs the output image according to the new blending value K', which calculation as mentioned above, detail description is omitted herein for sake of brevity.

Figure 10A:
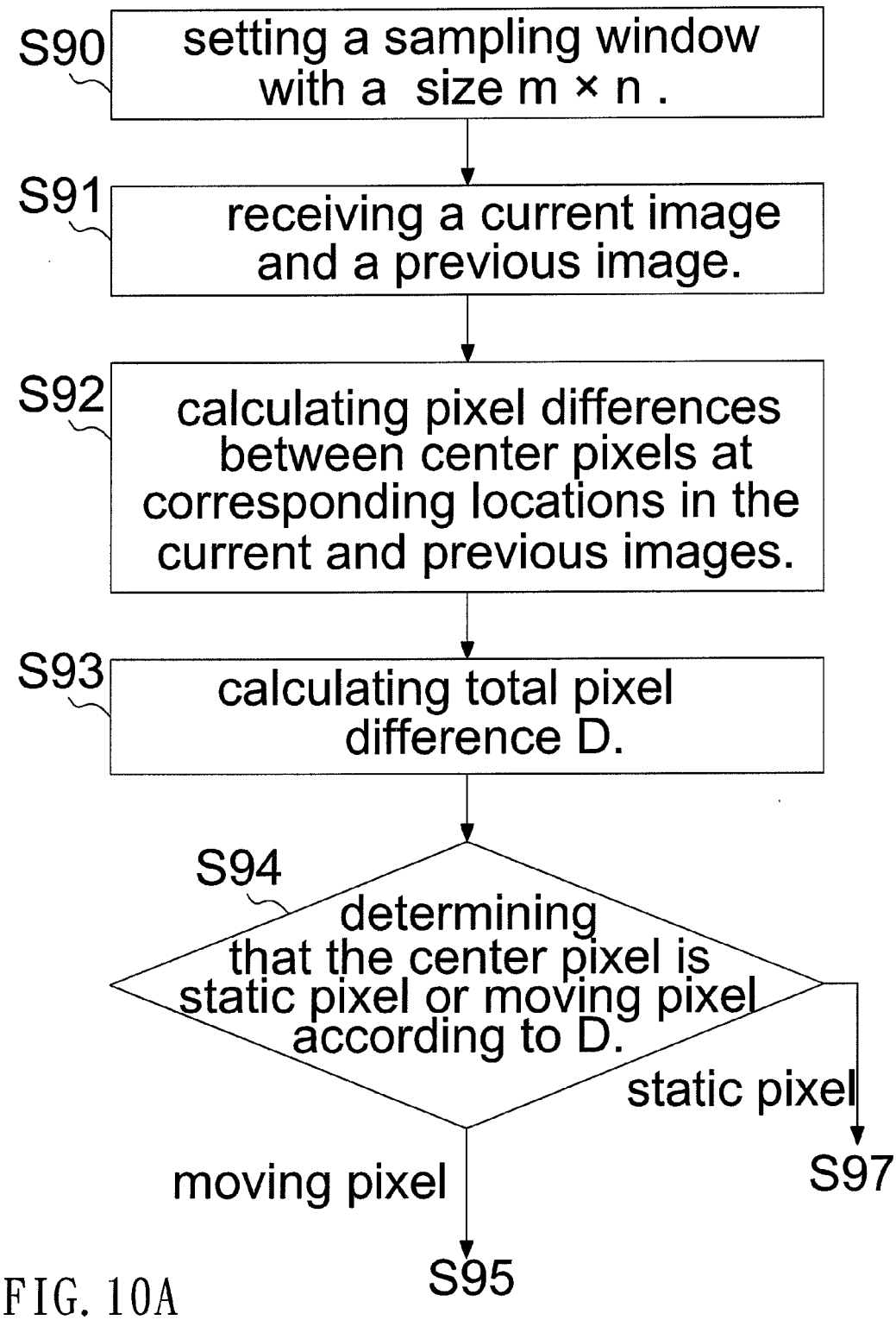
FIGS. 10A and 10B show a flowchart of an image processing method of the present invention.
Figure 10B:
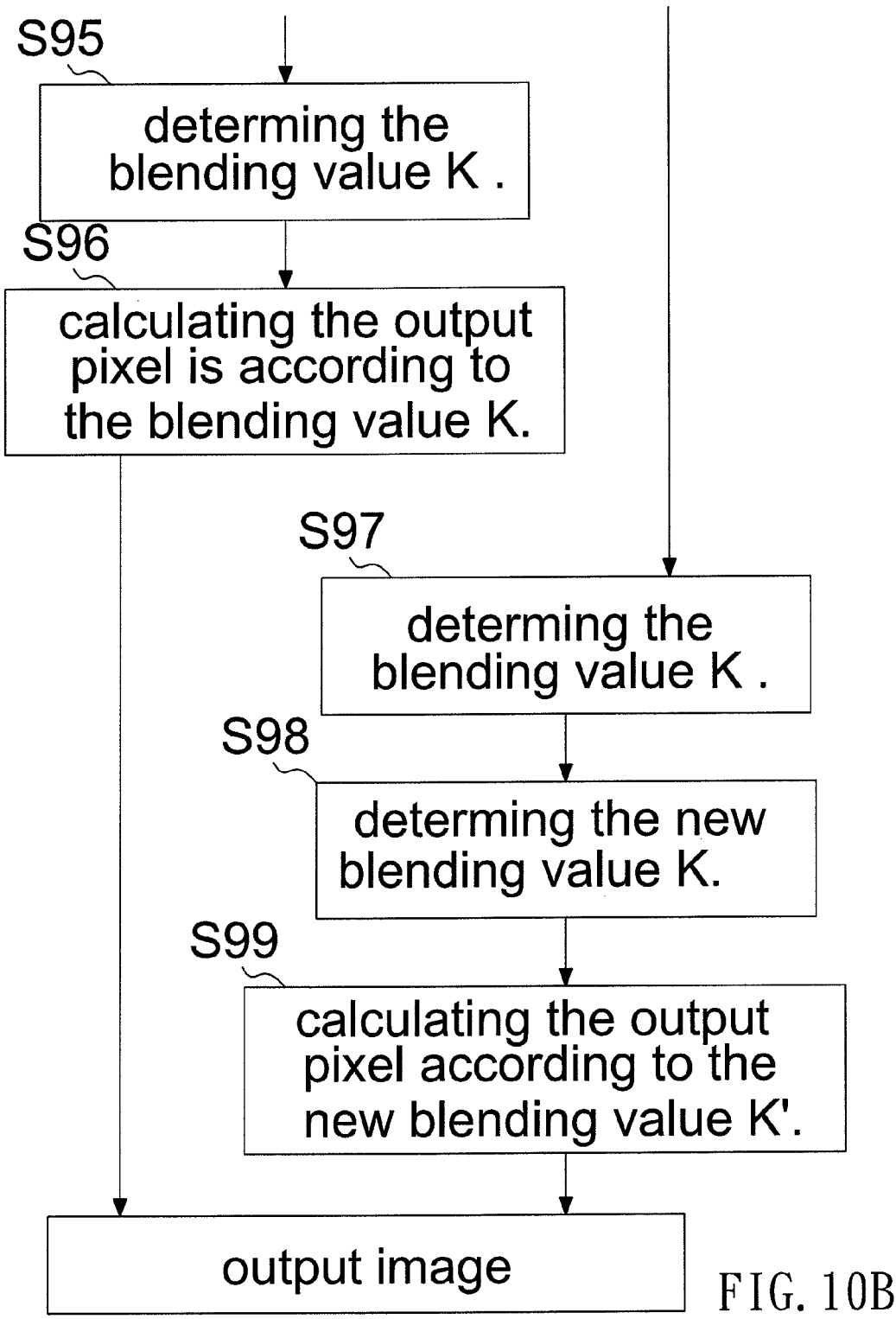

Referring to FIGS. 10A and 10B, an image processing method according to this invention is used to determine that an error between the current and the previous images is caused by a moving object of an image. The image processing method includes the steps as described below.

In step S90, setting a sampling window with a size m×n.

In step S91, receiving a current image and a previous image, wherein the current image is a kth frame (or kth field) and the previous image is a (k−1)th frame (or (k−1)th field).

In step S92, calculating pixel differences between center pixels at corresponding locations in the current image and the previous image, and collecting all the pixel differences to form a pixel difference matrix which size is equal to the sampling window.

In step S93, calculating total pixel difference D.

In step S94, determining that the center pixel is static pixel or moving pixel according to the total pixel difference D. Moving on to Step S95, if the center pixel is moving pixel; moving on to Step S97, if the center pixel is static pixel;

In step S95, determining the blending value K of the center pixel, determining the method of determination as above-mentioned embodiment, and then moving on to step S96.

In step S96, calculating the output pixel according to the blending value K of each pixel. When calculating the output pixels of all the pixels, collecting the output pixels to form an output image, which is feedback for using as a previous image in the next calculation. The formula for calculating the output pixel as shown in following:

output pixel=corresponding pixel value of current image×K+corresponding pixel value of previous image×(1−K)

In step S97, determining the blending value K of the center pixel, determining the method of determination as above-mentioned embodiment, and then moving on to step S98.

In step S98, determining the new blending value K' of the center pixel, and determining the method of determination as above-mentioned embodiment, and then moving on to step S99.

In step S99, calculating the output pixel according to the new blending value K' of each pixel. When calculating the output pixels of all the pixels, collecting the output pixels to form an output image, which is feedback for using as a previous image in the next calculation. The formula for calculating the output pixel is shown in following:

output pixel=corresponding pixel value of current image×K'+corresponding pixel value of previous image×(1−K')

In sum, in an image sequence, when there is a moving object in previous and subsequent images, the image processing apparatus and method of this invention are capable of accurately determining between whether the total pixel difference is raised by noise interference or object motion. Therefore, this invention can prevent from the situation that mistakenly deems a moving object as a noise interference so that cause a error occur when dealing with an image sequence.

What is claimed is:

1. The image processing method comprising:
storing a plurality of first pixels of a previous image and a plurality of second pixels of a current image in a sampling window;
calculating a plurality of pixel differences between the plurality of first pixels of the previous image and the plurality of second pixels of the current image in the sampling window, and generating a total pixel difference according to a sum of the plurality of pixel differences; wherein the second pixel is at a position corresponding to the first pixel;
deciding a first blending value of a pixel of in the sampling window and determining whether the pixel is a static pixel or a moving pixel according to the total pixel difference;
determining a second blending value when the pixel is a static pixel; and
calculating the current image and the previous image using weighted average according to the first blending value so as to generate and output an output image when the pixel is a moving pixel; and
calculating the current image and the previous image using weighted average according to the second blending value so as to generate and output the output image when the pixel is a static pixel;
wherein the pixel is in a first position of the current image; and the previous image has a first previous pixel, a second previous pixel, and a third previous pixel which positions are corresponding to the first position;
wherein the blending value determining unit determines a first, second, and third previous blending values for the first, second, and third previous pixels respectively;
wherein the second blending value is equal to the first previous blending value when the pixel number of the first, second, and third previous pixels belonging to the static pixel is equal to or smaller than a predetermined value; and the second blending value is equal to the first blending value when the number of the first, second, and third previous pixels belonging to static pixel is greater than a predetermined value.

2. The image processing method according to claim 1, wherein the pixel is belonging to the moving pixel when the total pixel difference is equal to or greater than a threshold value; the pixel is the static pixel when the total pixel difference is smaller than the threshold value.

3. The image processing method according to claim 2, further comprises:

adding the pixel of the current image with a pixel of the previous image using weighted average according to the first blending value to output an output pixel of the output image, wherein the position of the pixel of the previous image corresponds to the position of the pixel of the current image.

4. The image processing method comprising:

storing a plurality of first pixels of a previous image and a plurality of second pixels of a current image in a sampling window;

calculating a plurality of pixel differences between the plurality of first pixels of the previous image and the plurality of second pixels of the current image in the sampling window, and generating a total pixel difference according to a sum of the plurality of pixel differences; wherein the second pixel is at a position corresponding to the first pixel;

deciding a first blending value of a pixel of in the sampling window and determining whether the pixel is a static pixel or a moving pixel according to the total pixel difference;

determining a second blending value when the pixel is a static pixel; and calculating the current image and the previous image using weighted average according to the first blending value so as to generate and output an output image when the pixel is a moving pixel; and calculating the current image and the previous image using weighted average according to the second blending value so as to generate and output the output image when the pixel is a static pixel;

wherein the pixel is in a first position of the current image; and the previous image has a first previous pixel, a second previous pixel, and a third previous pixel which positions are corresponding to the first position;

a first, second, and third previous blending values are determined for the first, second, and third previous pixels respectively;

wherein the second blending value is equal to a calculation of the first and second previous blending values when the number of the first, second, and third previous pixels belonging to the static pixel is equal to or smaller than a predetermined value; and the second blending value is the first blending value when the number of the first, second, and third previous pixels belonging to static pixel is greater than a predetermined value.

5. The image processing method according to claim 4, wherein the calculation is an average of the first and second previous blending values.

* * * * *